US012803478B2

(12) United States Patent
Matsuo et al.

(10) Patent No.: US 12,803,478 B2
(45) Date of Patent: Nov. 17, 2026

(54) POWER CONVERSION APPARATUS, MOTOR DRIVE DEVICE, AND REFRIGERATION CYCLE APPLICATION DEVICE

(71) Applicant: Mitsubishi Electric Corporation, Tokyo (JP)

(72) Inventors: Haruka Matsuo, Tokyo (JP); Tomohiro Kutsuki, Tokyo (JP); Takaaki Takahara, Tokyo (JP); Koichi Arisawa, Tokyo (JP); Kenji Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 18/713,467

(22) PCT Filed: Dec. 3, 2021

(86) PCT No.: PCT/JP2021/044501
§ 371 (c)(1),
(2) Date: May 24, 2024

(87) PCT Pub. No.: WO2023/100359
PCT Pub. Date: Jun. 8, 2023

(65) Prior Publication Data
US 2025/0023497 A1 Jan. 16, 2025

(51) Int. Cl.
*H02P 21/05* (2006.01)
*H02P 21/14* (2016.01)
(Continued)

(52) U.S. Cl.
CPC .............. *H02P 21/05* (2013.01); *H02P 21/14* (2013.01); *H02P 21/22* (2016.02); *H02P 27/06* (2013.01)

(58) Field of Classification Search
CPC .... H02P 6/15; H02P 6/26; H02P 6/085; H02P 21/05; H02P 6/28; H02P 29/50;
(Continued)

(56) References Cited

U.S. PATENT DOCUMENTS 5,481,451 A * 1/1996 Kuwahara ............. H02M 5/458 363/41
7,053,569 B2 5/2006 Takahashi
(Continued)

FOREIGN PATENT DOCUMENTS

EP 2667502 A1 11/2013
EP 3537583 A1 9/2019
(Continued)

OTHER PUBLICATIONS

Office Action issued Nov. 3, 2025 in related U.S. Appl. No. 18/044,096.
(Continued)

*Primary Examiner* — Antony M Paul
(74) *Attorney, Agent, or Firm* — Posz Law Group, PLC

(57) ABSTRACT

A power conversion apparatus includes a converter that rectifies a first alternating-current voltage supplied from an alternating-current power supply that is a three-phase alternating-current power supply, a capacitor connected to an output end of the converter and smooths a first direct-current voltage obtained by rectification by the converter into a second direct-current voltage containing a first ripple, an inverter that is connected across the capacitor and converts the second direct-current voltage into a second alternating-current voltage dependent on a desired frequency, and a voltage detection unit that detects a physical quantity correlated with the second direct-current voltage, in which the second alternating-current voltage is controlled such that a
(Continued)

second ripple correlated with the first ripple is superimposed on an output voltage from the inverter.

6 Claims, 9 Drawing Sheets

(51) Int. Cl.
*H02P 21/22* (2016.01)
*H02P 27/06* (2006.01)

(58) Field of Classification Search
CPC .. H02P 6/10; H02P 27/06; H02P 21/22; H02P 6/08; H02P 27/12; H02P 25/03; H02P 6/16; H02P 23/00; H02P 2201/01; H02P 23/04; H02P 2201/09; H02P 25/0925; H02P 1/30; H02P 6/181; H02P 21/00; H02P 2207/05; H02P 29/032; H02P 21/14; H02P 2201/07; H02P 23/14; H02P 27/085; H02P 9/009; H02P 27/08; H02P 6/14; H02M 1/14; H02M 5/458; H02M 7/797; H02M 1/143; H02M 1/12; H02M 5/4585; H02M 7/537; H02M 1/4233; H02M 3/155; H02M 3/158; H02M 1/322; H02M 7/4807; H02M 3/156; H02M 5/451; H02M 7/53871; H02M 1/4225; H02M 1/0003; H02M 1/0006; H02M 5/297; H02M 7/4833; H02M 5/2573; H02K 9/00; H02K 11/04; H02K 41/03; H02K 3/18; B60L 2210/40; B60L 2240/529; B60L 2240/429; B60L 2240/427; B60L 15/08; F25B 31/02; F25B 1/04; F25B 13/00; F25B 2600/021; F25B 2600/024; F25B 2700/151; F25B 43/006; F25B 49/025; F04B 17/03; H02H 7/122; F24F 11/86; F24F 11/88
See application file for complete search history.

(56) References Cited

U.S. PATENT DOCUMENTS

| | | | |
|---|---|---|---|
| 10,439,542 | B2 | 10/2019 | Taniguchi et al. |
| 10,511,233 | B2 | 12/2019 | Ogawa et al. |
| 11,196,356 | B2 | 12/2021 | Hiranuma et al. |
| 2012/0113693 | A1 | 5/2012 | Sekimoto et al. |
| 2013/0300327 | A1 | 11/2013 | Sekimoto et al. |
| 2014/0062354 | A1 | 3/2014 | Choi et al. |
| 2015/0365038 | A1 | 12/2015 | Saha et al. |
| 2016/0218624 | A1 | 7/2016 | Ishizeki et al. |
| 2018/0145602 | A1 | 5/2018 | Wei et al. |
| 2018/0191288 | A1* | 7/2018 | Li .......................... H02P 6/185 |
| 2018/0367024 | A1 | 12/2018 | Kim et al. |
| 2019/0280606 | A1 | 9/2019 | Ono et al. |
| 2020/0212818 | A1 | 7/2020 | Kataoka et al. |
| 2023/0308025 | A1 | 9/2023 | Takahara et al. |
| 2023/0336090 | A1 | 10/2023 | Takahara et al. |
| 2023/0378867 | A1 | 11/2023 | Takahara et al. |

FOREIGN PATENT DOCUMENTS

| | | | |
|---|---|---|---|
| JP | H07-071805 | A | 3/1995 |
| JP | 2002-051589 | A | 2/2002 |
| JP | 2002-354826 | A | 12/2002 |
| JP | 2005-020836 | A | 1/2005 |
| JP | 2007-181358 | A | 7/2007 |
| JP | 2009-017673 | A | 1/2009 |
| JP | 2011-205729 | A | 10/2011 |
| JP | 2012-157242 | A | 8/2012 |
| JP | 2016-073203 | A | 5/2016 |
| JP | 2019-161757 | A | 9/2019 |

OTHER PUBLICATIONS

Non-Final Office Action issued on Mar. 14, 2025 in related U.S. Appl. No. 18/044,096.
Final Office Action issued on Jul. 30, 2025 in related U.S. Appl. No. 18/044,096.
Office Action mailed on Jan. 31, 2026 issued in related Chinese Patent Application No. 202080106414.6 (and partial English machine translation).
Office Action mailed on Jun. 23, 2025 issued in corresponding Chinese Patent Application No. 202080106399.5 (and English machine translation).
Office Action dated Jun. 10, 2025 issued in the related Chinese Patent Application No. 202080106414.6 (and English translation).
Office Action dated Jun. 20, 2025 issued in the related Chinese Patent Application No. 202080106184.3 (and English translation).
International Search Report of the International Searching Authority mailed Feb. 1, 2022 in corresponding International Application No. PCT/JP2021/044501 (and English translation).
International Search Report of the International Searching Authority mailed Dec. 1, 2020 for the corresponding international application No. PCT/JP2020/040131 (and English Translation).
Extended European Search Report dated Nov. 6, 2023 issued for the corresponding European Patent Application No. 20959702.0.
Office Action dated Nov. 14, 2023 issued for the corresponding Indian Patent Application No. 202327013852 (and English translation).
Office Action dated Dec. 11, 2023 issued for the corresponding Australian Patent Application No. 2020475165.
International Search Report of the International Searching Authority mailed Dec. 1, 2020, issued in corresponding International Application No. PCT/JP2020/040133 (and English Machine Translation).
Office Action dated Nov. 16, 2023 issued in corresponding IN patent application No. 202327013851.
Office Action mailed Dec. 26, 2023 in corresponding Japanese Patent Application No. 2022-558619 (and English machine translation).
International Search Report of the International Searching Authority mailed Dec. 1, 2020, issued in corresponding International Application No. PCT/JP2020/040132 (and English machine translation).
Indian Office Action mailed Nov. 24, 2023 in corresponding Indian Patent Application No. 202327017512 (and English translation).
Office Action mailed on Jun. 3, 2026 in related U.S. Appl. No. 18/044,096.
Hearing Notice mailed on Feb. 26, 2026 for the corresponding Indian Patent Application No. 202327013852.

* cited by examiner

POWER CONVERSION APPARATUS, MOTOR DRIVE DEVICE, AND REFRIGERATION CYCLE APPLICATION DEVICE

CROSS REFERENCE TO RELATED APPLICATION

This application is a U.S. national stage application of PCT/JP2021/044501 filed on Dec. 3, 2021, the contents of which are incorporated herein by reference.

FIELD

The present disclosure relates to a power conversion apparatus that converts an alternating-current power into desired power, a motor drive device, and a refrigeration cycle application device.

BACKGROUND

Traditionally, there has been a power conversion apparatus that converts an alternating-current power supplied from an alternating-current power supply into a desired alternating-current power and supplies the alternating-current power to a load such as an air conditioner. For example, Patent Literature 1 discloses a technique in which a power conversion apparatus that is a device for controlling an air conditioner rectifies an alternating-current power supplied from an alternating-current power supply with a diode stack that is a rectifying unit, converts power smoothed by a smoothing capacitor into a desired alternating-current power with an inverter including a plurality of switching elements, and outputs the alternating-current power to a compressor motor that is a load.

CITATION LIST

Patent Literature

Patent Literature 1: Japanese Patent Application Laid-open No. 7-71805

SUMMARY OF INVENTION

Problem to be Solved by the Invention

However, according to the related art as described above, a large current flows to a smoothing capacitor. Therefore, there has been a problem in that aged deterioration of the smoothing capacitor is accelerated. In view of such a problem, a method for preventing a ripple change of a capacitor voltage by increasing a capacity of the smoothing capacitor or a method for using the smoothing capacitor having a large deterioration tolerance by the ripple is considered. However, cost of capacitor components increases, and a size of a device increases.

The present disclosure has been made in view of the above, and an object of the present disclosure is to obtain a power conversion apparatus that can prevent an increase in size of the device while preventing deterioration of a smoothing capacitor.

Means to Solve the Problem

To solve the problem described above and achieve the object, a power conversion apparatus according to the present disclosure includes: a converter rectifying a first alternating-current voltage supplied from a three-phase alternating-current power supply; a capacitor connected to an output end of the converter, the capacitor smoothing a first direct-current voltage obtained by rectification by the converter into a second direct-current voltage containing a first ripple; an inverter connected across the capacitor, the inverter converting the second direct-current voltage into a second alternating-current voltage, the second alternating-current voltage being dependent on a desired frequency; and a detection unit detecting a physical quantity correlated with the second direct-current voltage. The second alternating-current voltage is controlled such that a second ripple correlated with the first ripple is superimposed on an output voltage from the inverter.

Effects of the Invention

A power conversion apparatus according to the present disclosure achieves an effect of preventing an increase in size of the device, while preventing deterioration of a smoothing capacitor.

DESCRIPTION OF EMBODIMENTS

Hereinafter, a power conversion apparatus, a motor drive device, and a refrigeration cycle application device according to embodiments of the present disclosure will be described in detail with reference to the drawings.

First Embodiment

Figure 1:
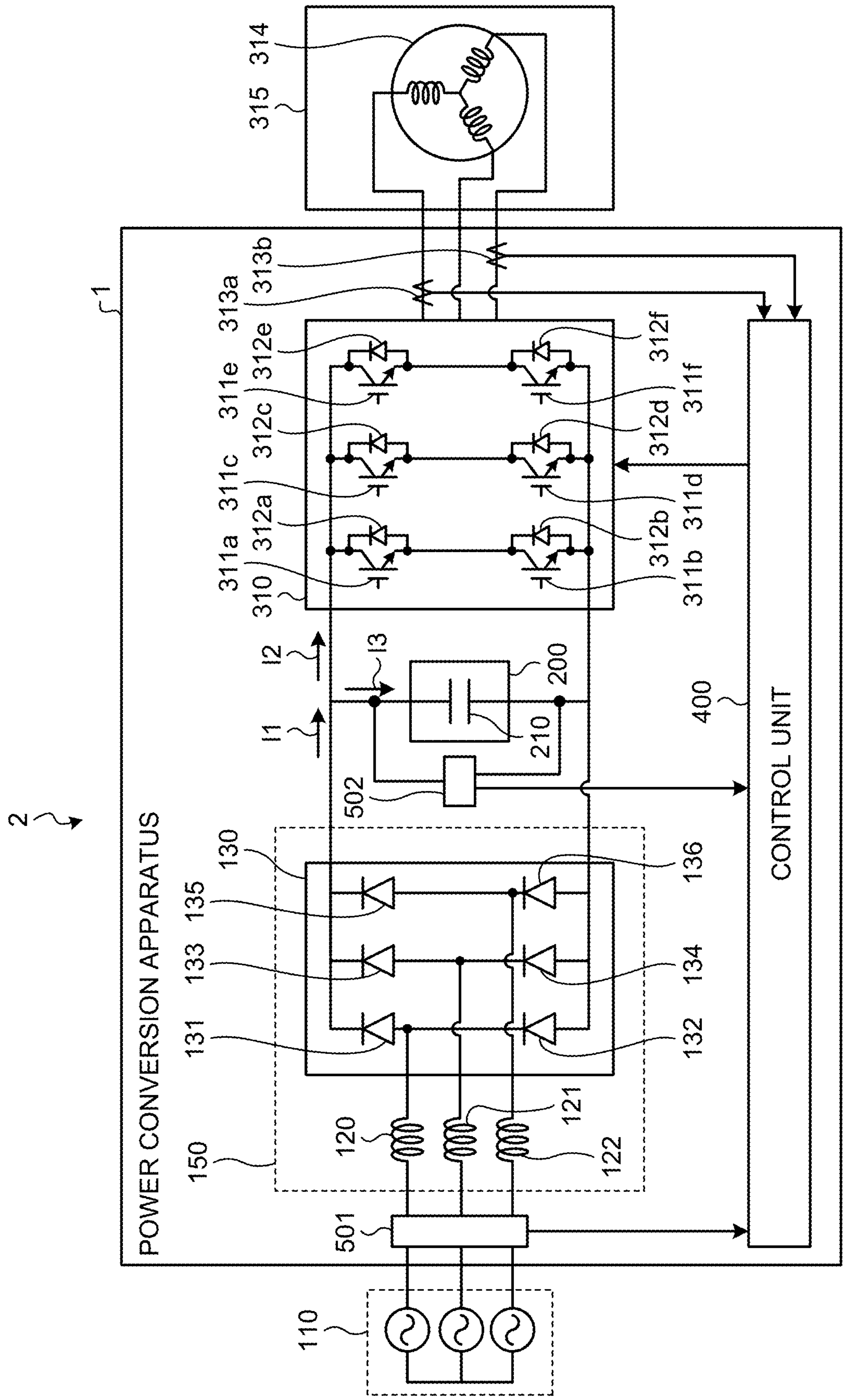
FIG. 1 is a diagram illustrating a configuration example of a power conversion apparatus according to a first embodiment.

FIG. 1 is a diagram illustrating a configuration example of a power conversion apparatus 1 according to a first embodiment. The power conversion apparatus 1 is connected to an alternating-current power supply 110 and a compressor 315. The power conversion apparatus 1 converts a first alternating-current voltage of a power supply voltage Vs supplied from the alternating-current power supply 110 that is a three-phase alternating-current power supply into a second alternating-current voltage having a desired amplitude and phase and supplies the second alternating-current voltage to the compressor 315. A connection method of the alternating-current power supply 110 may be Y connection or A connection. The power conversion apparatus 1 includes a voltage detection unit 501, a converter 150, a smoothing unit 200, a voltage detection unit 502, an inverter 310, current detection units 313*a* and 313*b*, and a control unit 400. The converter 150 includes reactors 120 to 122 and a rectifying unit 130. Note that the power conversion apparatus 1 and a motor 314 included in the compressor 315 constitute a motor drive device 2.

The voltage detection unit 501 detects a voltage value of the first alternating-current voltage of the power supply voltage Vs supplied from the alternating-current power supply 110 and outputs the detected voltage value to the control unit 400. The voltage detection unit 501 is a detection unit that detects a power state of the first alternating-current voltage. Note that the voltage detection unit 501 may detect a zero cross of the first alternating-current voltage, as the power state of the first alternating-current voltage.

The converter 150 rectifies the first alternating-current voltage of the power supply voltage Vs supplied from the alternating-current power supply 110 that is a three-phase alternating-current power supply. In the converter 150, the reactors 120 to 122 are connected between the alternating-current power supply 110 and the rectifying unit 130. The rectifying unit 130 includes a rectifying circuit including rectifying elements 131 to 136 and rectifies and outputs the first alternating-current voltage of the power supply voltage Vs supplied from the alternating-current power supply 110. The rectifying unit 130 performs full-wave rectification.

The smoothing unit 200 is connected to an output end of the rectifying unit 130. The smoothing unit 200 includes a capacitor 210 as a smoothing element and smooths a voltage rectified by the rectifying unit 130. The capacitor 210 is, for example, an electrolytic capacitor, a film capacitor, or the like. The capacitor 210 is connected to an output end of the converter 150, specifically, the output end of the rectifying unit 130 and has a capacity for smoothing the voltage rectified by the rectifying unit 130. A voltage generated in the capacitor 210 by smoothing does not have a full-wave rectification waveform of the alternating-current power supply 110 and has a waveform in which a voltage ripple according to a frequency of the alternating-current power supply 110 is superimposed on a direct-current component, and the voltage does not largely pulsate. In a case where the alternating-current power supply 110 is a three-phase alternating-current power supply, a frequency of the voltage ripple mainly includes a six-fold component of a frequency of the power supply voltage Vs. In a case where power input from the alternating-current power supply 110 and power output from the inverter 310 do not change, an amplitude of the voltage ripple is determined according to the capacity of the capacitor 210. For example, the pulsation is performed within a range in which a maximum value of the voltage ripple generated in the capacitor 210 is less than twice of a minimum value. In this way, the capacitor 210 is connected to the output end of the converter 150, and smooths a first direct-current voltage rectified by the converter 150 into a second direct-current voltage including a first ripple.

The voltage detection unit 502 detects a direct-current bus line voltage $V_{dc}$ that is a voltage across the smoothing unit 200, that is, the capacitor 210 charged by the current rectified by the rectifying unit 130 and flowing from the rectifying unit 130 into the smoothing unit 200 and outputs the detected voltage value to the control unit 400. The voltage detection unit 502 is a detection unit that detects a physical quantity correlated with the second direct-current voltage including the first ripple, as the power state of the capacitor 210. In the following description, the voltage detection unit 502 may be referred to as a first detection unit, and the physical quantity detected by the voltage detection unit 502 may be referred to as a first physical quantity.

The inverter 310 is connected across the smoothing unit 200, that is, the capacitor 210. The inverter 310 includes switching elements 311*a* to 311*f* and freewheeling diodes 312*a* to 312*f*. The inverter 310 turns on/off the switching elements 311*a* to 311*f* under control of the control unit 400, converts a voltage output from the rectifying unit 130 and the smoothing unit 200 into the second alternating-current voltage having the desired amplitude and phase, that is, generate the second alternating-current voltage, and outputs the second alternating-current voltage to the motor 314 of the connected compressor 315. The inverter 310 converts the second direct-current voltage including the first ripple into the second alternating-current voltage dependent on a desired frequency.

Each of the current detection units 313*a* and 313*b* detects a current value of one phase of three-phase currents output from the inverter 310 and outputs the detected current value to the control unit 400. Note that, by acquiring current values of two phases among the current values of the three phases output from the inverter 310, the control unit 400 can calculate the current value of the remaining one-phase of the current output from the inverter 310. The current detection units 313*a* and 313*b* are detection units that acquire a second physical quantity including a third ripple correlated with a rotation speed generated by the motor 314. In the following description, the current detection units 313*a* and 313*b* may be referred to as a second detection unit.

The compressor 315 is a load including the motor 314 for compressor driving. The motor 314 rotates according to the amplitude and the phase of the second alternating-current voltage supplied from the inverter 310 and performs a compression operation. For example, in a case where the compressor 315 is a sealed compressor used for an air conditioner or the like, a load torque of the compressor 315 can be often regarded as a constant torque load. Regarding the motor 314, although a case where motor winding is in Y connection is illustrated in FIG. 1, this is an example, and the motor 314 is not limited to this. The motor winding of the motor 314 may be A connection or may have a specification in which the Y connection and the A connection can be switched.

Note that, in the power conversion apparatus 1, arrangement of each configuration illustrated in FIG. 1 is an example, and the arrangement of each configuration is not limited to the example illustrated in FIG. 1. For example, the power conversion apparatus 1 may include a booster and may cause the rectifying unit 130 to have a function of a booster. In the following description, the voltage detection units 501 and 502 and the current detection units 313*a* and 313*b* may be collectively referred to as a detection unit. Furthermore, the voltage values detected by the voltage detection units 501 and 502 and the current values detected by the current detection units 313*a* and 313*b* may be respectively referred to as a detection value.

The control unit 400 acquires the voltage value of the power supply voltage Vs of the first alternating-current voltage from the voltage detection unit 501, acquires the voltage value of the direct-current bus line voltage $V_{dc}$ of the smoothing unit 200 from the voltage detection unit 502, and acquires the current value of the second alternating-current voltage having the desired amplitude and phase converted by the inverter 310, from the current detection units 313*a* and 313*b*. The control unit 400 controls an operation of the inverter 310, specifically, on/off of the switching elements 311*a* to 311*f* included in the inverter 310, by using the detection value detected by each detection unit. Furthermore, the control unit 400 controls an operation of the motor 314, by using the detection value detected by each detection unit. In the present embodiment, the control unit 400 controls the operation of the inverter 310 such that the second alternating-current voltage including pulsation according to pulsation of the current flowing from the rectifying unit 130 into the capacitor 210 of the smoothing unit 200 is output from the inverter 310 to the compressor 315 that is a load. The pulsation according to the pulsation of the current flowing into the capacitor 210 of the smoothing unit 200 is, for example, pulsation that varies depending on a frequency or the like of the pulsation of the current flowing into the capacitor 210 of the smoothing unit 200. As a result, the control unit 400 reduces the current flowing to the capacitor 210 of the smoothing unit 200. Note that the control unit 400 does not need to use all of the detection values acquired from each detection unit and may perform control by using some detection values. The control unit 400 controls the second alternating-current voltage such that a second ripple correlated with the first ripple detected by the voltage detection unit 502 is superimposed on an output voltage from the inverter 310.

The control unit 400 performs control such that any one of a speed, a voltage, and a current of the motor 314 is in a desired state. Here, in a case where the motor 314 is used to drive the compressor 315 and the compressor 315 is a sealed compressor, it is difficult to attach a position sensor that detects a rotor position to the motor 314 in terms of structure and cost. Therefore, the control unit 400 controls the motor 314 without the position sensor. As a method for controlling the motor 314 without the position sensor, there are two types of methods including primary magnetic flux constant control and sensorless vector control. In the present embodiment, as an example, the sensorless vector control will be described. Note that the control method to be described below can be applied to the primary magnetic flux constant control with a minor change. In the present embodiment, as will be described later, the control unit 400 controls the operations of the inverter 310 and the motor 314, by using dq rotation coordinates that rotate in synchronization with the rotor position of the motor 314.

Control for reducing the current flowing to the capacitor 210 of the smoothing unit 200 by the control unit 400 will be described below. As illustrated in FIG. 1, in the power conversion apparatus 1, an input current from the rectifying unit 130 to the capacitor 210 of the smoothing unit 200 is referred to as an input current I1, an output current from the capacitor 210 of the smoothing unit 200 to the inverter 310 is referred to as an output current I2, and a charge/discharge current of the capacitor 210 of the smoothing unit 200 is referred to as a charge/discharge current I3. In this case, a relationship of the input current I1=the output current I2+the charge/discharge current I3 is satisfied. Flowing the charge/discharge current I3 in the capacitor 210 means that the capacitor 210 is charged/discharged, and a voltage across the capacitor 210, that is, the direct-current bus line voltage $V_{dc}$ is pulsated by charging/discharging the capacitor 210. Therefore, the control unit 400 reduces the charge/discharge current I3 of the capacitor 210, by performing control for preventing the pulsation of the direct-current bus line voltage $V_{dc}$. The control unit 400 can reduce the charge/discharge current I3 of the capacitor 210, by adding a current corresponding to the pulsation of the direct-current bus line voltage $V_{dc}$ to the output current I2.

Figure 2:
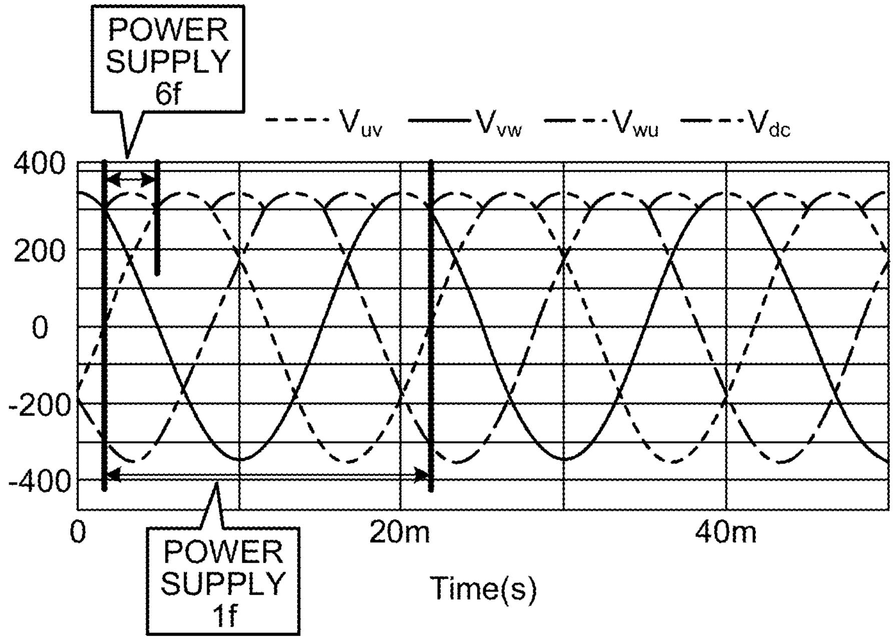
FIG. 2 is a diagram illustrating an example of pulsation of a direct-current bus line voltage when a first alternating-current voltage supplied from an alternating-current power supply is in a three-phase equilibrium state, in the power conversion apparatus according to the first embodiment.
Figure 3:
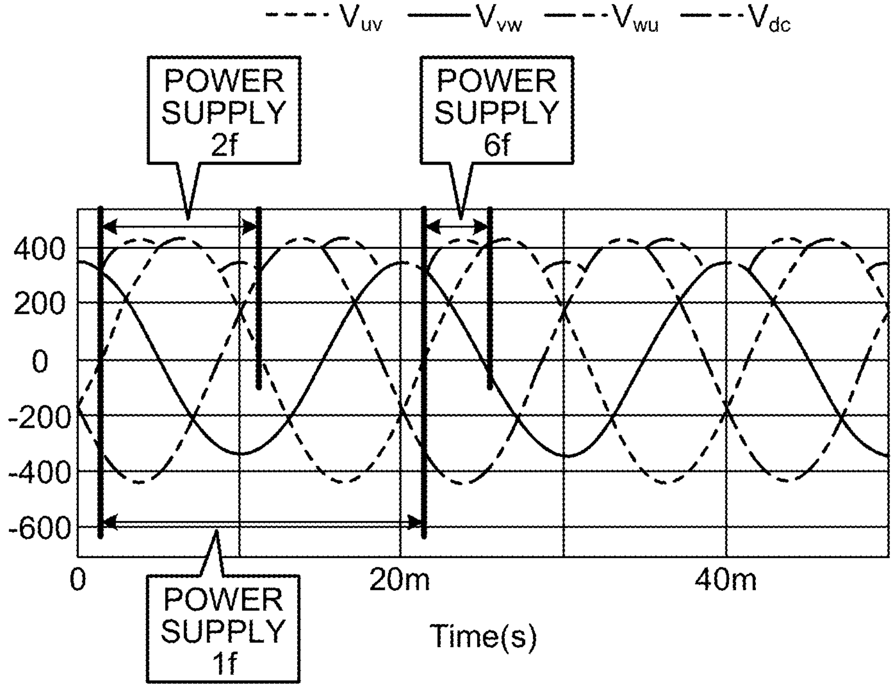
FIG. 3 is a diagram illustrating an example of pulsation of the direct-current bus line voltage when the first alternating-current voltage supplied from the alternating-current power supply is in a three-phase non-equilibrium state, in the power conversion apparatus according to the first embodiment.

The pulsation of the direct-current bus line voltage $V_{dc}$ is affected by the alternating-current power supply 110 that is the three-phase alternating-current power supply, and includes two types of frequency components that are roughly divided. Specifically, the two types include a frequency component that is six times as large as the power supply frequency of the alternating-current power supply 110 generated by overlap of the phases of the three-phase alternating-current and a frequency component that is twice as large as the power supply frequency of the alternating-current power supply 110 generated by non-equilibrium of the three-phase alternating-current. FIG. 2 is a diagram illustrating an example of the pulsation of the direct-current bus line voltage $V_{dc}$ when the first alternating-current voltage supplied from the alternating-current power supply 110 is in a three-phase equilibrium state, in the power conversion apparatus 1 according to the first embodiment. FIG. 3 is a diagram illustrating an example of the pulsation of the direct-current bus line voltage $V_{dc}$ when the first alternating-current voltage supplied from the alternating-current power supply 110 is in a three-phase non-equilibrium state, in the power conversion apparatus 1 according to the first embodiment. Here, a power supply frequency of the alternating-current power supply 110 that is the three-phase alternating-current power supply, that is, a fundamental frequency of the first alternating-current voltage, is set as f.

As illustrated in FIG. 2, in a case where the first alternating-current voltage is in the three-phase equilibrium state, the pulsation of the direct-current bus line voltage $V_{dc}$ is 6f cycles. As illustrated in FIG. 3, in a case where the first alternating-current voltage is in the three-phase non-equilibrium state, the pulsation of the direct-current bus line voltage $V_{dc}$ is 2f cycles. In a case where the power supply frequency of the alternating-current power supply 110 that is the three-phase alternating-current power supply, that is, the fundamental frequency of the first alternating-current voltage, is 50 Hz, 6f=300 Hz, and 2f=100 Hz. The frequency of the first ripple is a frequency that is twice or six times as large as the power supply frequency of the alternating-current power supply 110 that is the three-phase alternating-current power supply, that is, the fundamental frequency of the first alternating-current voltage. Note that, in FIGS. 2 and 3, the fundamental frequency f is written as a power supply 1f, the pulsation frequency of the direct-current bus line voltage $V_{dc}$ when the first alternating-current voltage is in the three-phase equilibrium state is written as a power supply 6f, and the pulsation frequency of the direct-current bus line voltage $V_{dc}$ when the first alternating-current voltage is in the three-phase non-equilibrium state is written as a power supply 2f. In the actual power conversion apparatus 1, pulsations in various frequency bands are generated according to effects of wiring of the alternating-current power supply 110 and an operation state of the compressor 315 that is the load. However, the pulsation is omitted here.

If a pulsation state of the direct-current bus line voltage $V_{dc}$ can be correctly acquired, the control unit 400 can perform control for preventing the pulsation of the direct-current bus line voltage $V_{dc}$, by controlling the operations of the inverter 310, the motor 314, or the like. In the present embodiment, since the voltage detection unit 502 directly detects the voltage value of the direct-current bus line voltage $V_{dc}$, the control unit 400 can correctly acquire the pulsation state of the direct-current bus line voltage $V_{dc}$, by acquiring the detection value from the voltage detection unit 502. Note that the method for acquiring the pulsation state of the direct-current bus line voltage $V_{dc}$ by the control unit 400 is not limited to this. For example, it is possible to estimate the pulsation state of the direct-current bus line voltage $V_{dc}$ from a current flowing to a bus line of the power conversion apparatus 1, and it is possible to estimate the pulsation state of the direct-current bus line voltage $V_{dc}$ from a current flowing to the capacitor 210. Therefore, the control unit 400 may acquire a detection value from a detection unit that detects the current flowing to the bus line of the power conversion apparatus 1, a detection unit that detects the current flowing to the capacitor 210, or the like (not illustrated in FIG. 1), and estimate the pulsation state of the direct-current bus line voltage $V_{dc}$. For example, the control unit 400 can calculate the pulsation of the direct-current bus line voltage $V_{dc}$, by using a general capacitor voltage-current method, that is, "I=C×dV/dt" →"dV/dt=I/C".

In this way, the control unit 400 can extract a frequency component of the pulsation of the direct-current bus line voltage $V_{dc}$, by acquiring a physical quantity correlated with the pulsation of the direct-current bus line voltage $V_{dc}$, such as an instantaneous value of the direct-current bus line voltage $V_{dc}$ or an instantaneous value of the current flowing to the capacitor 210. The physical quantity correlated with the direct-current bus line voltage $V_{dc}$ is the instantaneous value of the direct-current bus line voltage $V_{dc}$ that is the second direct-current voltage including the first ripple or the instantaneous value of the current flowing to the capacitor 210.

As described above, the control unit 400 detects the pulsation of the direct-current bus line voltage $V_{dc}$ corresponding to the charge/discharge current I3 that is the current flowing to the capacitor 210 and controls an inverter output to prevent the pulsation, so as to indirectly reduce the current flowing to the capacitor 210, that is, the charge/discharge current I3. Here, information necessary for the control by the control unit 400 includes the detection value of the direct-current bus line voltage $V_{dc}$ and the frequency component of the pulsation of the direct-current bus line voltage $V_{dc}$.

Figure 4:
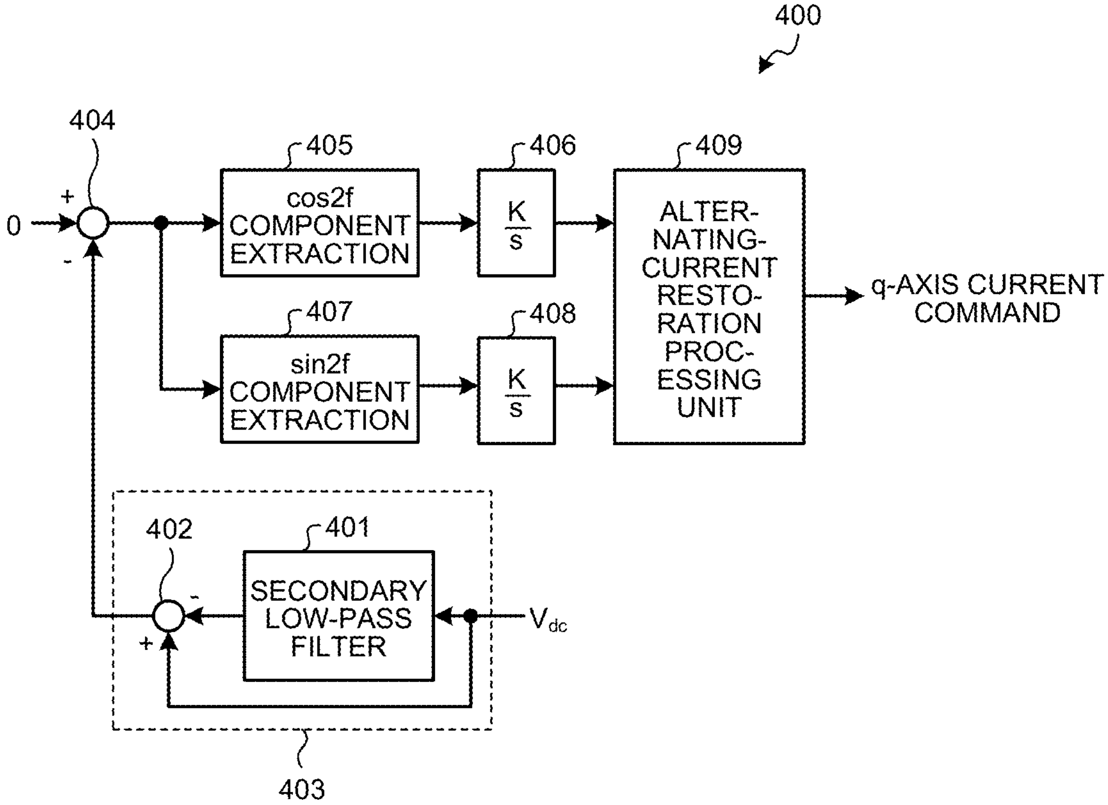
FIG. 4 is a first block diagram illustrating a configuration for generating a q-axis current command for preventing the pulsation of the direct-current bus line voltage included in a control unit of the power conversion apparatus according to the first embodiment.

FIG. 4 is a first block diagram illustrating a configuration for generating a q-axis current command for preventing the pulsation of the direct-current bus line voltage $V_{dc}$ included in the control unit 400 of the power conversion apparatus 1 according to the first embodiment. The configuration illustrated in FIG. 4 is formed by a feedback loop in which a value of the q-axis current command is zero, in order to set the pulsation of the direct-current bus line voltage $V_{dc}$ to zero. Although the direct-current bus line voltage $V_{dc}$ can be obtained according to the detection value of the voltage detection unit 502, a value estimated from a detection value of another detection unit may be used as described above. In the following description, the q-axis current command with the value of zero may be abbreviated and written as a command value 0.

A secondary low-pass filter 401 transmits a direct-current component of the direct-current bus line voltage $V_{dc}$. A subtraction unit 402 removes the direct-current component from the direct-current bus line voltage $V_{dc}$, by subtracting the direct-current component of the direct-current bus line voltage $V_{dc}$ that has passed through the secondary low-pass filter 401 from the direct-current bus line voltage $V_{dc}$. That is, a filter 403 is a kind of high-pass filter that removes the direct-current component from the direct-current bus line voltage $V_{dc}$. Note that, since an object of the filter 403 is to increase accuracy of extraction of a pulsation component to be described later, the filter 403 may be omitted. A subtraction unit 404 calculates a difference between the command value 0 and the direct-current bus line voltage $V_{dc}$ from which the direct-current component has been removed.

A pulsation component extraction unit 405 converts a specific frequency component, specifically, a cos 2f component, from the difference between the command value 0 and the direct-current bus line voltage $V_{dc}$ from which the direct-current component has been removed into a direct current and extracts the direct current. The reference character 2f indicates a frequency that is twice as large as the power supply frequency of the alternating-current power supply 110, that is, the fundamental frequency of the first alternating-current voltage. A pulsation component extraction unit 407 converts a specific frequency component, specifically, a sin 2f component, from the difference between the command value 0 and the direct-current bus line voltage $V_{dc}$ from which the direct-current component has been removed into a direct current and extracts the direct current. The pulsation component extraction units 405 and 407 prevent generation of beats, sideband waves, or the like and make a waveform be less likely to be distorted, by extracting and reducing only the pulsation of the specific frequency component. The control unit 400 performs simple Fourier transform by integrating a trigonometric function cos 2f having a frequency same as the specific frequency component to be extracted by the pulsation component extraction unit 405 and integrating a trigonometric function sin 2f having a frequency same as the specific frequency component to be extracted by the pulsation component extraction unit 407.

An integration control unit 406 performs integration control such that the frequency component extracted by the pulsation component extraction unit 405 becomes zero and calculates a necessary current amount. An integration control unit 408 performs integration control such that the frequency component extracted by the pulsation component extraction unit 407 becomes zero and calculates a necessary current amount. Note that the integration control units 406 and 408 may perform calculation in combination with proportional control, differential control, or the like, in addition to the integration control.

An alternating-current restoration processing unit 409 uses the calculation results of the integration control units 406 and 408 as inputs, and restores the calculation results into a single alternating-current signal. The alternating-current restoration processing unit 409 outputs the restored alternating-current signal as the q-axis current command. As a result, the control unit 400 can pulsate a q-axis current at the same frequency as the direct-current bus line voltage $V_{dc}$ and pulsate the output voltage of the inverter 310.

Note that, in the example in FIG. 4, in order to prevent the pulsation of the frequency component that is twice as large as the fundamental frequency of the first alternating-current voltage, the control unit 400 extracts the frequency component that is twice as large as the fundamental frequency of the first alternating-current voltage by the pulsation component extraction units 405 and 407. However, in a case where it is desired to prevent the pulsation of the frequency component that is six times as large as the fundamental frequency of the first alternating-current voltage as described above, it is sufficient to extract the frequency component that is six times as large as the fundamental frequency of the first alternating-current voltage by the pulsation component extraction units 405 and 407. Furthermore, in a case where it is desired to prevent the pulsations of the plurality of frequency components, for example, in a case where it is desired to prevent the pulsations of the frequency components that are twice and six times as large as the fundamental frequency of the first alternating-current voltage, the control unit 400 can provide the pulsation component extraction units and the integration control units, as many as the number of frequencies, in parallel, and extract the frequency components that are twice and six time as large as the fundamental frequency of the first alternating-current voltage.

Figure 5:
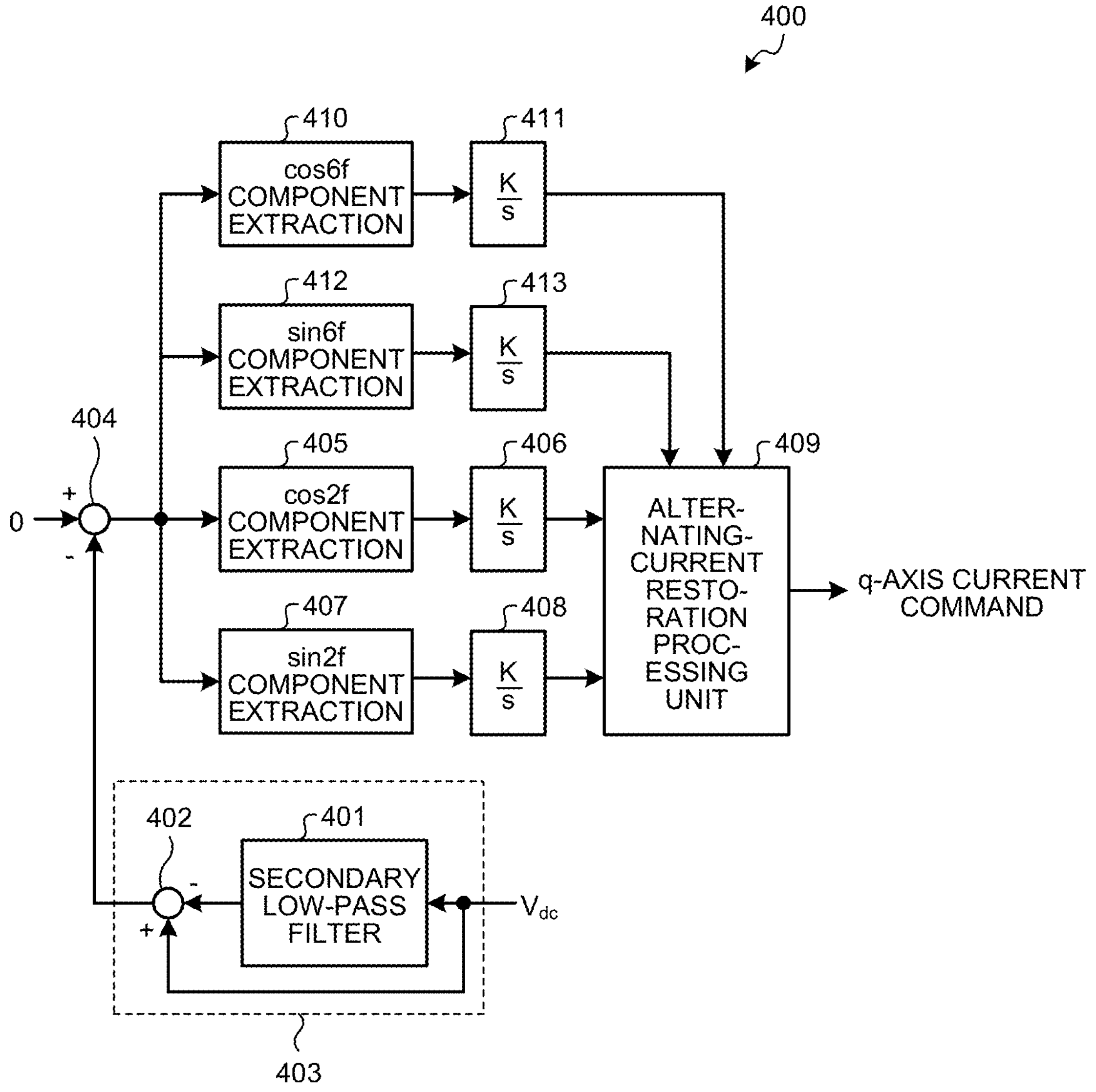
FIG. 5 is a second block diagram illustrating the configuration for generating the q-axis current command for preventing the pulsation of the direct-current bus line voltage included in the control unit of the power conversion apparatus according to the first embodiment.

FIG. 5 is a second block diagram illustrating the configuration for generating the q-axis current command for preventing the pulsation of the direct-current bus line voltage $V_{dc}$ included in the control unit 400 of the power conversion apparatus 1 according to the first embodiment. In the configuration illustrated in FIG. 5, pulsation component extraction units 410 and 412 and integration control units 411 and 413 are added to the configuration illustrated in FIG. 4.

The pulsation component extraction unit 410 converts a specific frequency component, specifically, a cos 6f component, from the difference between the command value 0 and the direct-current bus line voltage $V_{dc}$ from which the direct-current component has been removed into a direct current and extracts the direct current. The reference character 6f indicates a frequency that is six times as large as the power supply frequency of the alternating-current power supply 110, that is, the fundamental frequency of the first alternating-current voltage. The pulsation component extraction unit 412 converts a specific frequency component, specifically, a sin 6f component, from the difference between the command value 0 and the direct-current bus line voltage $V_{dc}$ from which the direct-current component has been removed into a direct current and extracts the direct current. Effects obtained by the pulsation component extraction units 410 and 412 are as described about the pulsation component extraction units 405 and 407 described above.

The integration control unit 411 performs integration control such that the frequency component extracted by the pulsation component extraction unit 410 becomes zero and calculates a necessary current amount. The integration control unit 413 performs integration control such that the frequency component extracted by the pulsation component extraction unit 412 becomes zero and calculates a necessary current amount. Note that the integration control units 411 and 413 may perform calculation in combination with proportional control, differential control, or the like, in addition to the integration control.

The alternating-current restoration processing unit 409 uses the calculation results of the integration control units 406, 408, 411, and 413 as inputs, and restores the calculation results into a single alternating-current signal. The alternating-current restoration processing unit 409 outputs the restored alternating-current signal as the q-axis current command. As a result, the control unit 400 can pulsate a q-axis current at the same frequency as the direct-current bus line voltage $V_{dc}$ and pulsate the output voltage of the inverter 310.

The control unit 400 adds the q-axis current command necessary for preventing the pulsation of the direct-current bus line voltage $V_{dc}$ to an existing q-axis current command. Here, the existing q-axis current command will be described. A magnetic flux direction of a motor magnet is defined as a d-axis, and a direction advanced by 90 degrees in an electrical angle phase from the d-axis, that is, a direction orthogonal to the d-axis, is defined as a q-axis. It is a known technique that, by flowing a current $I_q$ to a motor coil in the q-axis direction, a torque is generated in the motor 314 and generates a rotational force. In general, the control unit 400 of the power conversion apparatus 1 connected to the motor 314 includes a speed control unit (not illustrated) used to control the motor 314 to have a desired rotation speed. Since it is sufficient that a configuration of the speed control unit be a general configuration, detailed description is omitted. When an output of the speed control unit is denoted by $i_{qpi}$, the existing q-axis current command $i_q$* is represented by Expression (1).

$$i_q^* = i_{qpi} \tag{1}$$

Next, when an amplitude component of the pulsation of the direct-current bus line voltage $V_{dc}$ is denoted by $I_{qvdc}$, an angular speed of a frequency that is twice as large as the fundamental frequency of the first alternating-current voltage supplied from the alternating-current power supply 110 is denoted by $2\omega_{in}$, and a phase of the pulsation of the direct-current bus line voltage $V_{dc}$ is denoted by δ, the q-axis current command necessary for preventing the pulsation of the direct-current bus line voltage $V_{dc}$ is represented by Expression (2).

$$I_{qvdc}\sin(2\omega_{in} + \delta) \tag{2}$$

Therefore, when the q-axis current command necessary for preventing the pulsation of the direct-current bus line voltage $V_{dc}$ is added to the existing q-axis current command $i_q$*, this is represented by Expression (3).

$$i_q^* = i_{qpi} + I_{qvdc}\sin(2\omega_{in} + \delta) \tag{3}$$

In order to prevent the pulsation of the direct-current bus line voltage $V_{dc}$, the control unit 400 generates the q-axis current command $i_q$* represented by Expression (3) and controls the operations of the inverter 310, the motor 314, or the like. Note that, in a case where a frequency that is six times as large as the fundamental frequency of the first alternating-current voltage is desired to be targeted, it is sufficient that the control unit 400 set $2\omega_{in}$ as $6\omega_{in}$ in Expressions (2) and (3). Furthermore, in a case where a plurality of frequencies is targeted when the pulsation of the direct-current bus line voltage $V_{dc}$ is prevented, specifically, a frequency that is twice or six times as large as the fundamental frequency of the first alternating-current voltage is targeted, the control unit 400 may generate a q-axis current command $i_q$* denoted by Expression (4) and control the operations of the inverter 310, the motor 314, or the like.

$$i_q^* = i_{qpi} + I_{qvdc}\sin(2\omega_{in} + \delta) + I_{qvdc}\sin(6\omega_{in} + \delta) \tag{4}$$

Furthermore, the control unit 400 may further add the q-axis current command used for vibration preventing control of the motor 314 to the q-axis current command $i_q$* represented by Expressions (3) or (4). A load pulsation generated by the rotation of the motor 314 of the compressor 315 can be prevented by a q-axis current command output from a pulsation compensation unit as described in Japanese Patent No. 6537725, for example. Therefore, it is sufficient that the control unit 400 include such a pulsation compensation unit. When an amplitude component of the load pulsation of the compressor 315 is denoted by $I_{qavs}$, an angular speed of a mechanical angular rotation frequency of the compressor 315 is denoted by $\omega_m$, and a phase of the load pulsation of the compressor 315 is denoted by ε, the q-axis current command output from the pulsation compensation unit is represented by Expression (5).

$$I_{gavs}\sin(\omega_m + \varepsilon) \tag{5}$$

The control unit 400 controls the second alternating-current voltage such that a fourth ripple correlated with the third ripple is superimposed on the output voltage from the inverter 310. Therefore, when the q-axis current command for the vibration preventing control is added to the q-axis current command in Expressions (3) and (4), the q-axis current commands are respectively represented by Expressions (6) and (7).

$$i_q^* = i_{qpi} + I_{qvdc}\sin(2\omega_{in} + \delta) + I_{qavs}\sin(\omega_m + \varepsilon) \tag{6}$$

$$i_q^* = i_{qpi} + I_{qvdc}\sin(2\omega_{in} + \delta) + I_{qvdc}\sin(6\omega_{in} + \delta) + I_{qavs}\sin(\omega_m + \varepsilon) \tag{7}$$

The control unit 400, in order to prevent the pulsation of the direct-current bus line voltage $V_{dc}$ and further perform the vibration preventing control, generates the q-axis current command $$i_q^*$$

represented by Expressions (6) or (7) and controls the operations of the inverter 310, the motor 314, or the like. Here, since a current amount to be flown as a q-axis current is actually limited, that is, a maximum current amount is set, a case is considered where it is not possible to flow the current amount as in the q-axis current commands $$i_q^*$$

in Expressions (3), (4), (6), and (7). Therefore, the control unit 400 sets a limit value to the q-axis current command for each control. A method for setting the limit value includes, for example, a method for determining a priority and allocating the q-axis current each time, a method for distributing the q-axis current at a ratio determined from the beginning, or the like. For the former case, for example, the priority is determined as $i_{qpi}>I_{qvdc}>I_{qavs}$. For the latter case, for example, a limit value of a usable q-axis current is divided as $i_{qpi}:I_{qvdc}:I_{qavs}=4:3:3$.

Figure 6:
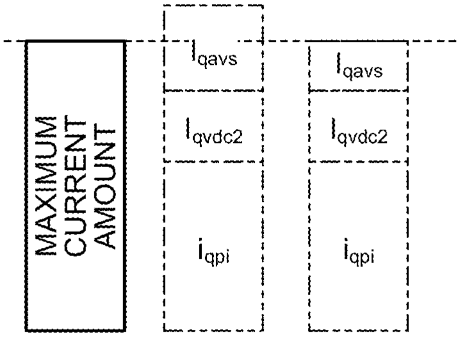
FIG. 6 is a first diagram illustrating a ratio of a current amount of each control with respect to the q-axis current command by the control unit of the power conversion apparatus according to the first embodiment.
Figure 7:
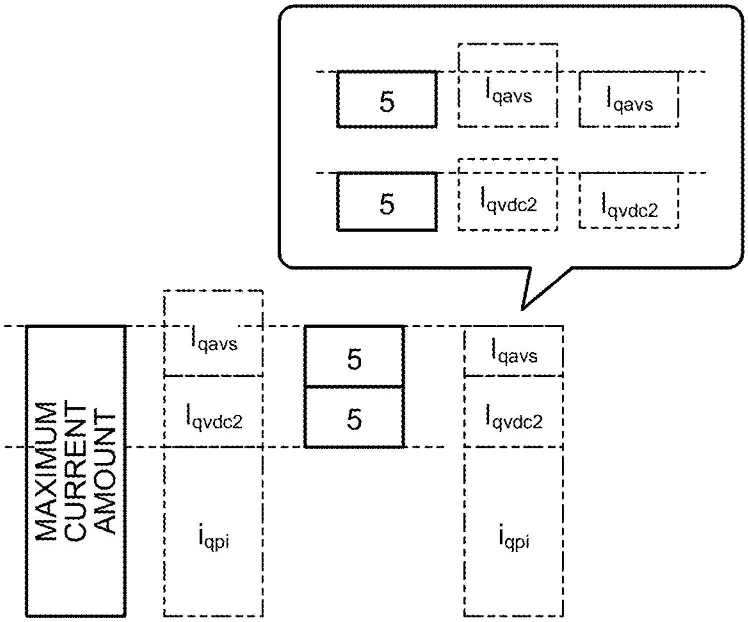
FIG. 7 is a second diagram illustrating the ratio of the current amount of each control with respect to the q-axis current command by the control unit of the power conversion apparatus according to the first embodiment.

Furthermore, the control unit 400 may distribute a remaining current amount obtained by subtracting the q-axis current command $i_{qpi}$ from the maximum current amount to the q-axis current command $I_{qvdc}$ used to prevent the pulsation of the direct-current bus line voltage $V_{dc}$ and the q-axis current command $I_{qavs}$ from the pulsation compensation unit, instead of limiting the q-axis current command $i_{qpi}$ from the speed control unit. FIG. 6 is a first diagram illustrating a ratio of the current amount of each control with respect to the q-axis current command $$i_q^*$$

by the control unit 400 of the power conversion apparatus 1 according to the first embodiment. FIG. 7 is a second diagram illustrating the ratio of the current amount of each control with respect to the q-axis current command $i_g$* by the control unit 400 of the power conversion apparatus 1 according to the first embodiment. Note that FIGS. 6 and 7 are for Expression (6), and $I_{qvdc2}$ represents $I_{qvdc}\sin(2\omega_{in}+\delta)$. As illustrated in FIG. 6, the control unit 400 may allocate the q-axis current command $i_{qpi}$ and the q-axis current command $I_{qvdc2}$ as they are to the maximum current amount and may allocate the remaining current amount to the q-axis current command $I_{qavs}$. Furthermore, as illustrated in FIG. 7, the control unit 400 may allocate the q-axis current command $i_{qpi}$ to the maximum current amount as it is and may equally divide the remaining current amount into two and allocate the remaining amount to the q-axis current command $I_{qvdc2}$ and the q-axis current command $I_{qavs}$. In a case where Expression (7) is used in the example in FIG. 7, the control unit 400 may allocate the q-axis current command $i_{qpi}$ to the maximum current amount as it is and may equally divide the remaining current amount into three and allocate the remaining current amount to the q-axis current command $I_{qvdc2}$, the q-axis current command $I_{qvdc6}$, and the q-axis current command $I_{qavs}$. Note that it is assumed that $I_{qvdc6}$ represents $I_{qvdc}\sin(6\omega_{in}+\delta)$.

When the current of the q-axis current command $i_{qpi}$ that is the output from the speed control unit is limited, since it is not possible for the control unit 400 to keep desired rotation of the motor 314, the q-axis current command $i_{qpi}$ is basically prioritized. However, the q-axis current command $i_{qpi}$ may be limited depending on an application in which it is desired to continue the operation even if the rotation speed of the motor 314 is lowered. Furthermore, in FIGS. 6 and 7, the control unit 400 may freely set a ratio to each control according to an object. For example, when vibration is concerned at a low speed, the control unit 400 may allocate more currents to the q-axis current command $I_{qavs}$.

In this way, the control unit 400 can reduce the pulsation of the direct-current bus line voltage $V_{dc}$, by superimposing the pulsation including the frequency component same as the pulsation of the direct-current bus line voltage $V_{dc}$ generated by the alternating-current power supply 110 that is the three-phase alternating-current power supply on the inverter output. The control unit 400 uses the frequency that is six times or twice as large as, or both of the frequency six times as large as and the frequency that is twice as large as the power supply frequency of the alternating-current power supply 110 that is the three-phase alternating-current power supply, that is, the fundamental frequency of the first alternating-current voltage, as the frequency component. In a case where both of the frequencies that are six times and twice as large as the power supply frequency of the alternating-current power supply 110 that is the three-phase alternating-current power supply, that is, the fundamental frequency of the first alternating-current voltage, are used, the control unit 400 may increase one frequency component and decrease another frequency component. For example, as illustrated in FIGS. 2 and 3, if the first alternating-current voltage supplied from the alternating-current power supply 110 is in the three-phase equilibrium state, the direct-current bus line voltage $V_{dc}$ pulsates at the frequency that is six times as large as the fundamental frequency of the first alternating-current voltage, and if the first alternating-current voltage supplied from the alternating-current power supply 110 is in the three-phase non-equilibrium state, the direct-current bus line voltage $V_{dc}$ pulsates at the frequency that is twice as large as the fundamental frequency of the first alternating-current voltage. Therefore, the control unit 400 may change a ratio of the frequency of the pulsation to be superimposed on the inverter output, according to the equilibrium state of the first alternating-current voltage supplied from the alternating-current power supply 110. In this case, the frequency of the first ripple is a sum of the frequency components that are twice and six times as large as the power supply frequency of the alternating-current power supply 110 that is the three-phase alternating-current power supply, that is, the fundamental frequency of the first alternating-current voltage.

Note that the control unit 400 can determine whether or not the first alternating-current voltage supplied from the alternating-current power supply 110 is balanced according to the detection value from the voltage detection unit 501. Furthermore, the control unit 400 may estimate whether or not the first alternating-current voltage supplied from the alternating-current power supply 110 is balanced from the output of the pulsation component extraction unit illustrated in FIG. 5. In this way, the control unit 400 changes a ratio of the frequency component that is twice as large as the fundamental frequency of the first alternating-current voltage and the frequency component that is six times as large as the fundamental frequency of the first alternating-current voltage, in the sum, according to the equilibrium state of the voltages of the respective phases of the first alternating-current voltage.

Furthermore, the control unit 400 periodically calculates the fundamental frequency of the first alternating-current voltage that is the power supply frequency of the alternating-current power supply 110 that is the three-phase alternating-current power supply, by using the detection value of the voltage detection unit 501. The power supply frequency of the alternating-current power supply 110 may slightly vary in one day. Therefore, the control unit 400 can improve accuracy of the control described above, by periodically calculating the fundamental frequency of the first alternating-current voltage that is the power supply frequency of the alternating-current power supply 110.

Figure 8:
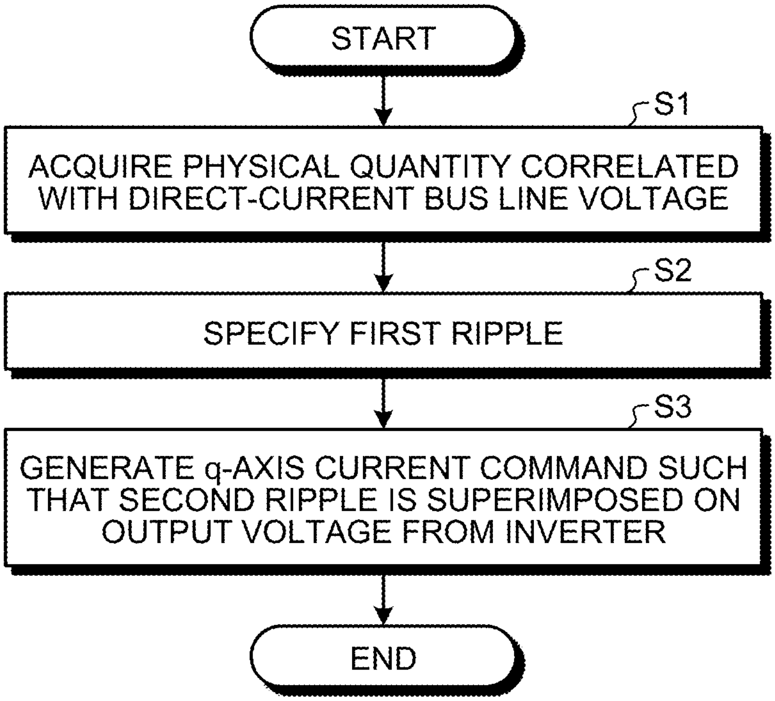
FIG. 8 is a flowchart illustrating an operation of the control unit of the power conversion apparatus according to the first embodiment.

The operation of the control unit 400 will be described with reference to a flowchart. FIG. 8 is a flowchart illustrating the operation of the control unit 400 of the power conversion apparatus 1 according to the first embodiment. In the power conversion apparatus 1, the control unit 400 acquires the physical quantity correlated with the direct-current bus line voltage $V_{dc}$ (step S1). The control unit 400 specifies the first ripple included in the direct-current bus line voltage $V_{dc}$ (step S2). The control unit 400 generates the q-axis current command such that the second ripple correlated with the first ripple is superimposed on the output voltage from the inverter 310 (step S3).

Figure 9:
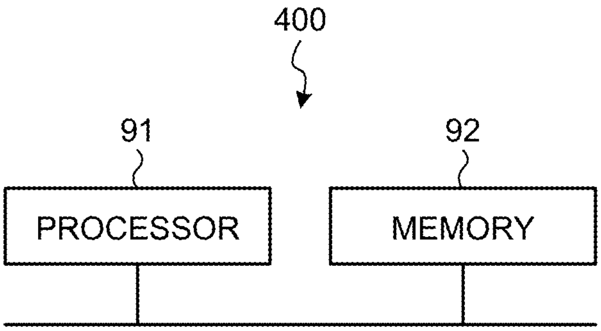
FIG. 9 is a diagram illustrating an example of a hardware configuration that implements the control unit included in the power conversion apparatus according to the first embodiment.

A hardware configuration of the control unit 400 included in the power conversion apparatus 1 will be described below. FIG. 9 is a diagram illustrating an example of a hardware configuration that implements the control unit 400 included in the power conversion apparatus 1 according to the first embodiment. The control unit 400 is implemented by a processor 91 and a memory 92.

The processor 91 is, for example, a central processing unit (CPU) (also referred to as a central processing unit, a processing device, an arithmetic device, a microprocessor, a microcomputer, a processor, or a digital signal processor (DSP)) or a system large scale integration (LSI). The memory 92 can be a nonvolatile or volatile semiconductor memory, such as a random access memory (RAN), a read only memory (ROM), a flash memory, an erasable programmable read only memory (EPROM), or an electrically erasable programmable read only memory (EEPROM) (registered trademark). Furthermore, the memory 92 is not limited to these and may be a magnetic disk, an optical disk, a compact disk, a mini disk, or a digital versatile disc (DVD).

As described above, according to the present embodiment, in the power conversion apparatus 1, the control unit 400 can reduce the pulsation of the direct-current bus line voltage $V_{dc}$, by superimposing the pulsation including the frequency component same as the pulsation of the direct-current bus line voltage $V_{dc}$ generated by the alternating-current power supply 110 that is the three-phase alternating-current power supply on the inverter output. Furthermore, the power conversion apparatus 1 can prevent an increase in size of the device while preventing deterioration of the smoothing capacitor 210.

Second Embodiment

In a second embodiment, a case where a converter includes a booster circuit will be described.

Figure 10:
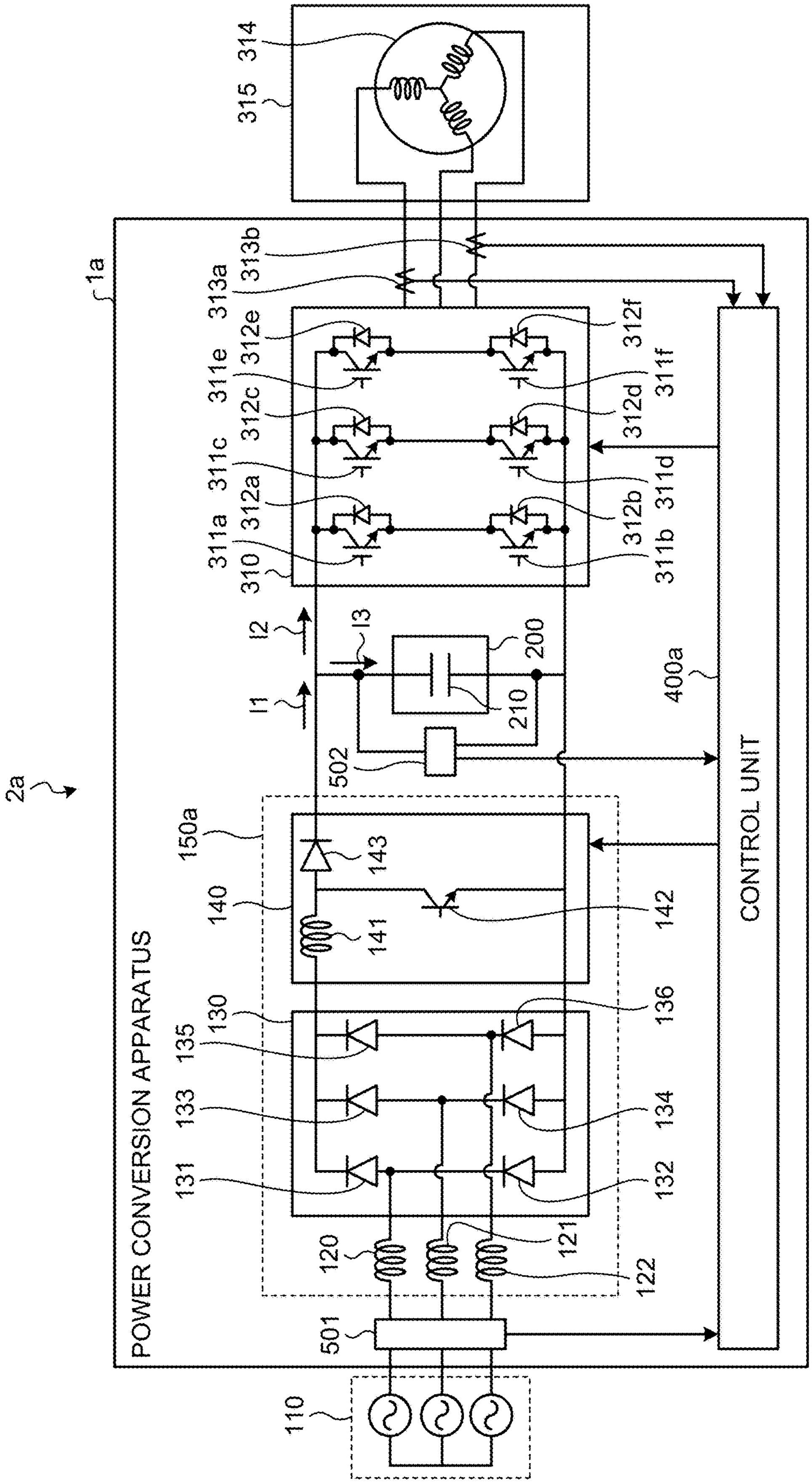
FIG. 10 is a first diagram illustrating a configuration example of a power conversion apparatus according to a second embodiment.

FIG. 10 is a diagram illustrating a configuration example of a power conversion apparatus 1*a* according to the second embodiment. The power conversion apparatus 1*a* is obtained by replacing the converter 150 and the control unit 400 in the power conversion apparatus 1 according to the first embodiment illustrated in FIG. 1 with a converter 150*a* and a control unit 400*a*. The converter 150*a* includes the reactors 120 to 122, the rectifying unit 130, and a booster 140. The booster 140 includes a reactor 141, a switching element 142, and a rectifying element 143 and constitutes a booster circuit. The booster 140 boosts a voltage rectified by the rectifying unit 130, by controlling on/off of the switching element 142 by the control unit 400*a*. Since it is sufficient that a boosting operation of the booster 140 be a general operation, detailed description is omitted. The control unit 400*a* has the function of the control unit 400 and a function for controlling on/off of the switching element 142 of the booster 140. That is, the control unit 400*a* controls an operation of the converter 150*a* including the booster 140. Note that the power conversion apparatus 1*a* and the motor 314 included in the compressor 315 constitute a motor drive device 2*a*.

For example, since a current for weak magnetic flux control or the like is not necessary for the rotation of the motor 314 by installing the booster circuit and increasing the direct-current bus line voltage $V_{dc}$, the power conversion apparatus 1*a* can increase a current amount that can be used for the q-axis current as compared with a case where the converter 150 is a passive circuit as in the first embodiment. As compared with the power conversion apparatus 1 according to the first embodiment, the power conversion apparatus 1*a* can increase a current that can be allocated to the q-axis current command $I_{qvdc}$ under the same load condition and at a rotational speed, or the like and can enhance an effect for preventing the pulsation of the direct-current bus line voltage $V_{dc}$.

Note that the configuration in which the converter of the power conversion apparatus has a boosting function is not limited to the example in FIG. 10. The converter 150 of the power conversion apparatus 1 according to the first embodiment is a passive circuit including passive components, and the value of the direct-current bus line voltage $V_{dc}$ is determined according to an amplitude value of the first alternating-current voltage supplied from the alternating-current power supply 110. However, in the first embodiment, it is sufficient that the pulsation of the direct-current bus line voltage $V_{dc}$ can be correctly detected and the pulsation of the frequency component same as the pulsation can be output from the inverter 310. Therefore, for example, in the rectifying unit 130, the rectifying elements 131 to 136, such as diodes, may be replaced with semiconductor elements, that is, active elements, such as switching elements, so as to form the booster circuit, and the control unit 400 or the like may control an operation of the active element.

Figure 11:
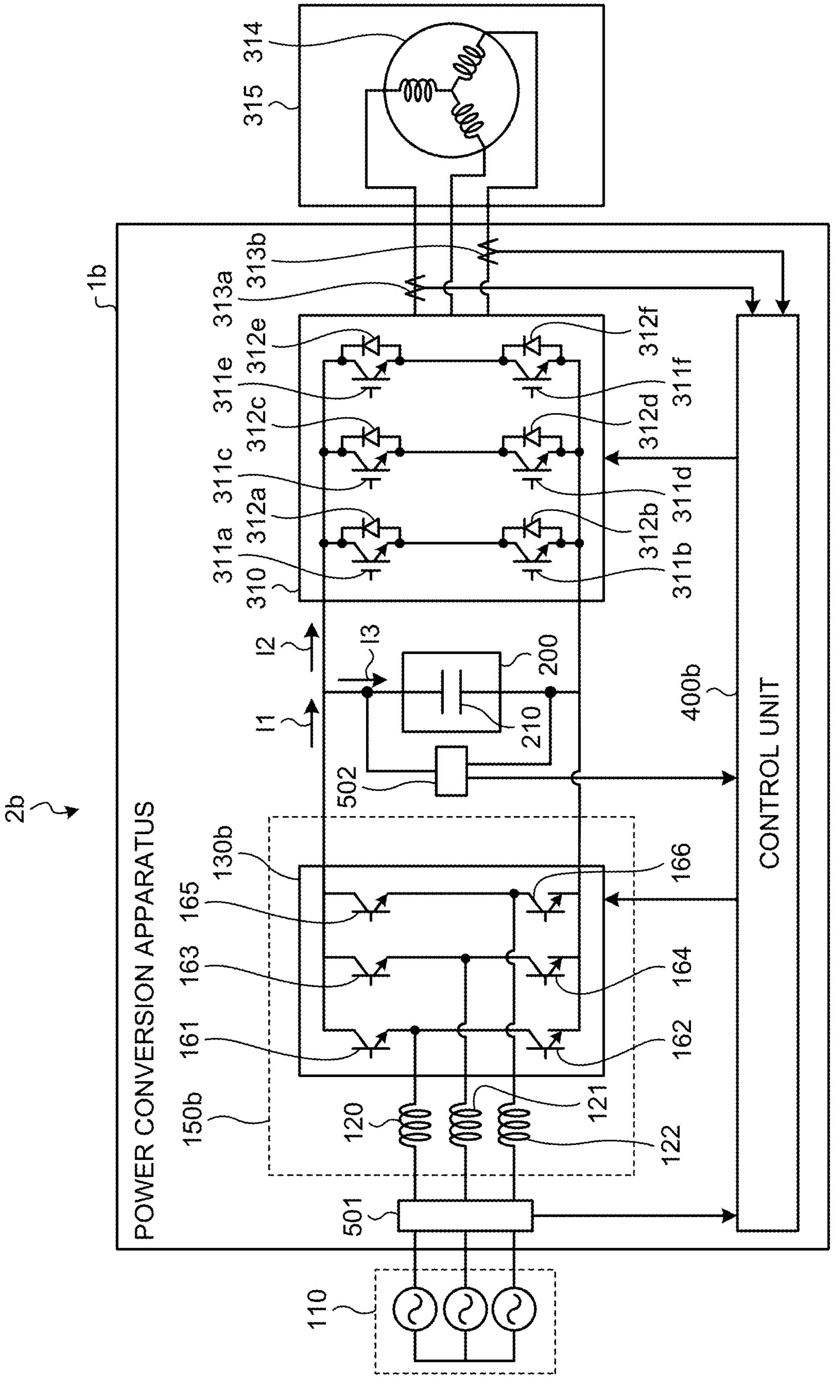
FIG. 11 is a second diagram illustrating the configuration example of the power conversion apparatus according to the second embodiment.

FIG. 11 is a diagram illustrating a configuration example of a power conversion apparatus 1*b* according to the second embodiment. The power conversion apparatus 1*b* is obtained by replacing the converter 150 and the control unit 400 in the power conversion apparatus 1 according to the first embodiment illustrated in FIG. 1 with a converter 150*b* and a control unit 400*b*. The converter 150*b* includes the reactors 120 to 122 and a rectifying unit 130*b*. The rectifying unit 130*b* includes switching elements 161 to 166. The switching elements 161 to 166 are, for example, semiconductor elements and are turned on/off under control of the control unit 400*b*. The rectifying unit 130*b* can boost and output a voltage by turning on/off the switching elements 161 to 166. The control unit 400*b* has the function of the control unit 400 and a function for controlling on/off of the switching elements 161 to 166 of the rectifying unit 130*b*. That is, the control unit 400*b* controls an operation of the converter 150*b*. Note that the rectifying unit 130*b* may have a configuration in which some of the six elements are used as switching elements and other elements are used as rectifying elements, such as diodes. In this case, effects similar to those of the power conversion apparatus 1*a* illustrated in FIG. 10 can be obtained. Note that the power conversion apparatus 1*b* and the motor 314 included in the compressor 315 constitute a motor drive device 2*b*.

In this way, the converter 150*a* in the power conversion apparatus 1*a* or the converter 150*b* in the power conversion apparatus 1*b* includes at least one switching element.

Third Embodiment

Figure 12:
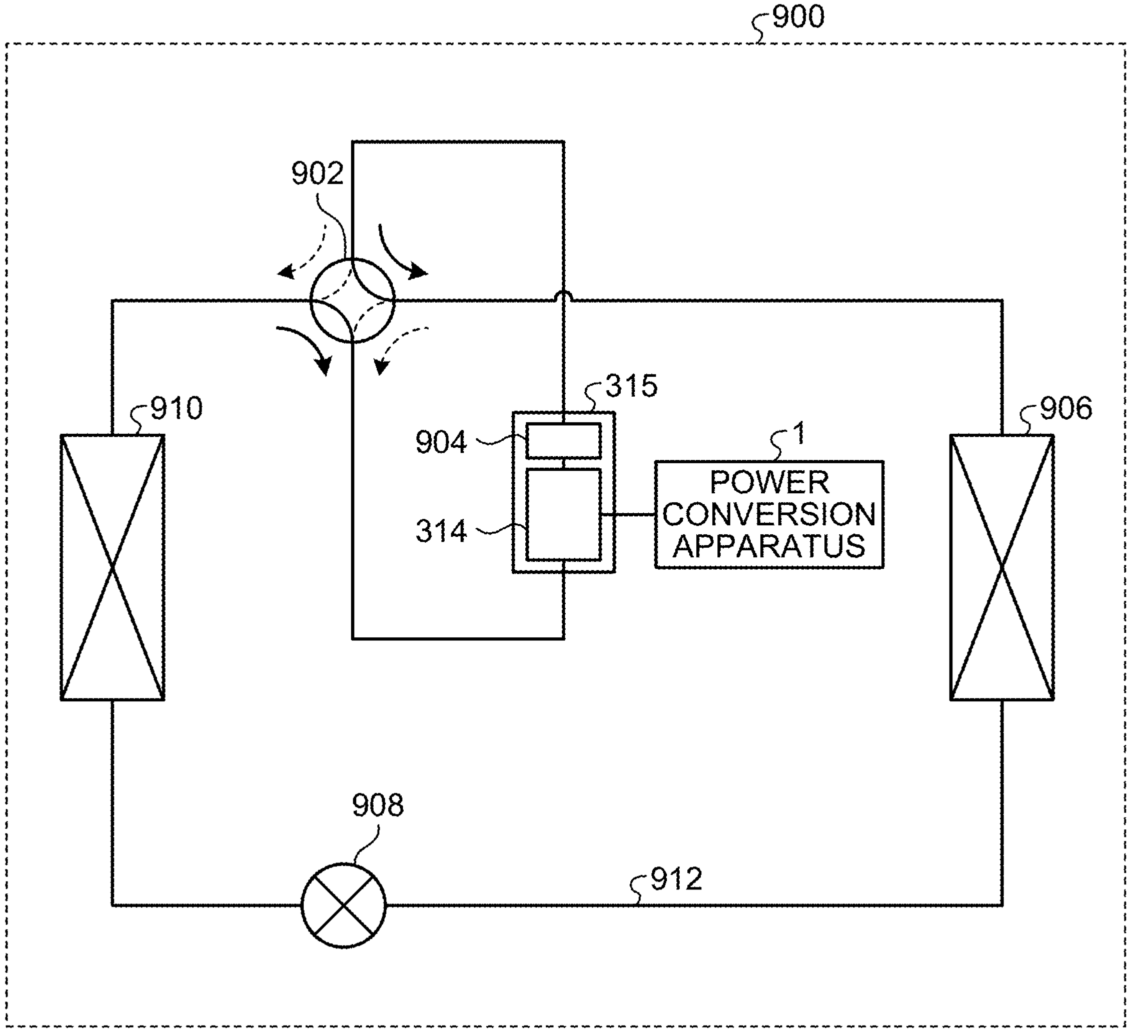
FIG. 12 is a diagram illustrating a configuration example of a refrigeration cycle application device according to a third embodiment.

FIG. 12 is a diagram illustrating a configuration example of a refrigeration cycle application device 900 according to a third embodiment. The refrigeration cycle application device 900 according to the third embodiment includes the power conversion apparatus 1 described in the first embodiment. Note that, although the refrigeration cycle application device 900 can include the power conversion apparatus 1*a* or the power conversion apparatus 1*b* described in the second embodiment, here, as an example, a case will be described where the power conversion apparatus 1 is included. The refrigeration cycle application device 900 according to the third embodiment can be applied to a product including a refrigerator cycle, such as an air conditioner, a refrigerator, a freezer, or a heat pump water heater. Note that, in FIG. 12, a component having the function similar to that in the first embodiment is denoted by the same reference as in the first embodiment.

In the refrigeration cycle application device 900, the compressor 315 including the motor 314 in the first embodiment, a four-way valve 902, an indoor heat exchanger 906, an expansion valve 908, an outdoor heat exchanger 910 are attached via a refrigerant pipe 912.

In the compressor 315, a compression mechanism 904 that compresses a refrigerant and the motor 314 that operates the compression mechanism 904 are provided.

The refrigeration cycle application device 900 can perform a heating operation or a cooling operation by a switching operation of the four-way valve 902. The compression mechanism 904 is driven by the motor 314 that is variable-speed controlled.

At the time of heating operation, as indicated by a solid arrow, the refrigerant is pressurized and sent by the compression mechanism 904, passes through the four-way valve 902, the indoor heat exchanger 906, the expansion valve 908, the outdoor heat exchanger 910, and the four-way valve 902, and returns to the compression mechanism 904.

At the time of cooling operation, as indicated by a broken arrow, the refrigerant is pressurized and sent by the compression mechanism 904, passes through the four-way valve 902, the outdoor heat exchanger 910, the expansion valve 908, the indoor heat exchanger 906, and the four-way valve 902, and returns to the compression mechanism 904.

At the time of heating operation, the indoor heat exchanger 906 acts as a condenser and releases heat, and the outdoor heat exchanger 910 acts as an evaporator and absorbs heat. As the time of cooling operation, the outdoor heat exchanger 910 acts as the condenser and releases heat, and the indoor heat exchanger 906 acts as the evaporator and absorbs heat. The expansion valve 908 decompresses and expands the refrigerant.

The configurations illustrated in the above embodiments indicate examples and can be combined with other known techniques. Furthermore, the embodiments can be combined with each other, and some configurations can be partially omitted or changed without departing from the scope of the present invention.

REFERENCE SIGNS LIST

1, 1*a*, 1*b* power conversion apparatus; 2, 2*a*, 2*b* motor drive device; 110 alternating-current power supply; 120 to 122, 141 reactor; 130, 130*b* rectifying unit; 131 to 136, 143 rectifying element; 140 booster; 142, 161 to 166, 311*a* to 311*f* switching element; 150, 150*a*, 150*b* converter; 200 smoothing unit; 210 capacitor; 310 inverter; 312*a* to 312*f* freewheeling diode; 313*a*, 313*b* current detection unit; 314 motor; 315 compressor; 400, 400*a*, 400*b* control unit; 401 secondary low-pass filter; 402, 404 subtraction unit; 403 filter; 405, 407, 410, 412 pulsation component extraction unit; 406, 408, 411, 413 integration control unit; 409 alternating-current restoration processing unit; 501, 502 voltage detection unit; 900 refrigeration cycle application device; 902 four-way valve; 904 compression mechanism; 906 indoor heat exchanger; 908 expansion valve; 910 outdoor heat exchanger; 912 refrigerant pipe.

The invention claimed is:

1. A power conversion apparatus comprising:

a converter rectifying a first alternating-current voltage supplied from a three-phase alternating-current power supply;

a capacitor connected to an output end of the converter, the capacitor smoothing a first direct-current voltage obtained by rectification by the converter into a second direct-current voltage containing a pulsation generated by the three-phase alternating-current power supply;

an inverter connected across the capacitor, the inverter converting the second direct-current voltage into a second alternating-current voltage, the second alternating-current voltage being dependent on a desired frequency;

a detection unit detecting an instantaneous value of the second direct-current voltage containing the pulsation generated by the three-phase alternating-current power supply or an instantaneous value of a current flowing to the capacitor; and a control unit controlling the second alternating-current voltage such that a pulsation including a frequency component same as the pulsation of the second direct-current voltage generated by the three-phase alternating-current power supply is superimposed on an output voltage from the inverter, wherein a frequency of the pulsation of the second direct-current voltage generated by the three-phase alternating-current power supply is a sum of frequency components that are twice and six times as large as a fundamental frequency of the first alternating-current voltage.

2. The power conversion apparatus according to claim 1, wherein according to an equilibrium state of voltages of respective phases of the first alternating-current voltage, the control unit changes a ratio of the frequency component that is twice as large as the fundamental frequency of the first alternating-current voltage to the frequency component that is six times as large as the fundamental frequency of the first alternating-current voltage in the sum.

3. The power conversion apparatus according to claim 1, wherein the converter includes at least one switching element.

4. The power conversion apparatus according to claim 1, wherein the fundamental frequency of the first alternating-current voltage that is a power supply frequency of the three-phase alternating-current power supply is periodically calculated.

5. A motor drive device comprising:

the power conversion apparatus according to claim 1.

6. A refrigeration cycle application device comprising:

the power conversion apparatus according to claim 1.

* * * * *